(12) United States Patent
Hage

(10) Patent No.: US 6,403,227 B1
(45) Date of Patent: Jun. 11, 2002

(54) AMINOSILANE COATING COMPOSITION, PROCESS, AND COATED ARTICLES

(75) Inventor: Martin L. Hage, Maple Grove, MN (US)

(73) Assignee: Vision-Ease Lens. Inc., Ramsey, MN (US)

( * ) Notice: Subject to any disclaimer, the term of this patent is extended or adjusted under 35 U.S.C. 154(b) by 0 days.

(21) Appl. No.: 09/563,793

(22) Filed: May 2, 2000

(51) Int. Cl.⁷ ............................... B32B 27/28
(52) U.S. Cl. ................. 428/447; 556/413; 556/425; 556/458; 528/27; 528/38; 549/215; 106/287.11
(58) Field of Search .................. 556/413, 425, 556/458; 428/447; 528/27, 38; 549/215; 106/287.11

(56) References Cited

U.S. PATENT DOCUMENTS

| | | |
|---|---|---|
| 3,166,527 A | 1/1965 | Ender |
| 3,837,876 A | 9/1974 | Mayuzumi et al. |
| 3,961,977 A | 6/1976 | Koda et al. |
| 4,378,250 A | 3/1983 | Treadway et al. |
| 6,057,040 A | 5/2000 | Hage |

*Primary Examiner*—Margaret G. Moore
*Assistant Examiner*—Kuo-Liang Peng
(74) *Attorney, Agent, or Firm*—Mark A. Litman & Assoc. P.A.

(57) ABSTRACT

An improved coating comprising a coating on a substrate is described. The coating comprises a crosslinked polymeric material derived from an alkine-bridged bis-(aminosilane) or comprising a mixture of the alkine-bridged bis-(aminosilane) and an epoxysilane. The alkine bridged bis-(aminosilane) may have the general formula:

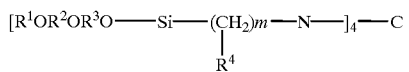

wherein
  $R^1$, $R^2$, and $R^3$ are independently selected from alkyl groups of 1 to 4 carbon atoms or phenyl groups,
  $R^4$ is selected from hydrogen, phenyl groups, and alkyl of from 1 to 4 carbon atoms, and
  m is 1, 2, 3 or 4.

The alkine bridged bis-(aminosilane) is itself a novel compound. A novel coating composition comprises a coating composition comprising a solution comprising and epoxysilane and an alkine-bridged bis-(amino-silane), especially where the alkine-bridged bis-(amino-silane) has the general formula:

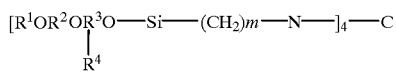

wherein
  $R^1$, $R^2$, and $R^3$ are independently selected from aliphatic groups or aromatic groups which complete a silane, and
  m is 1, 2, 3 or 4.

15 Claims, No Drawings

AMINOSILANE COATING COMPOSITION, PROCESS, AND COATED ARTICLES

BACKGROUND OF THE INVENTION

1. Field of the Invention

The present invention relates generally to coating compositions and, more particularly, to polyorganosiloxane compositions that can form mar resistant coatings and coatings made from these compositions.

2. Background of the Art

A variety of substrates, including those made of glass, plastic, metal, or masonry, are usefully coated with protective films to reduce their tendency to be abraded, to provide sacrificial surfaces, and to resist corrosion. It is generally desirable that protective coatings have good weathering and adhesion. It is also desirable that such coatings be resistant to thermal shock, mechanical shock, heat, humidity, and common chemicals. In addition, the coatings must be practical to prepare, apply, dry, and cure.

Some plastics are desirable substitutes for glass due to lighter weight, economically advantageous fabrications, and breakage resistance. However, commercially available plastic surfaces are less abrasion resistant, mar resistant, and scratch resistant than glass. Thus, protective coatings for plastic substrates are of particular interest. This is particularly true within the field of optical uses for plastic materials (e.g., as lenses, windows, covers, containers, ophthalmic layers, and the like) where damage to the surface of the polymer can significantly affect its function.

Much effort has been exerted in this field, and several different technical approaches have been described. In particular, work has been carried out on the development of polyorganosiloxanes crosslinked by the condensation of silanol groups.

Mayazumi, in U.S. Pat. No. 3,837,876, describes a polymer formed by reacting an aminosilane with an epoxysilane, dissolving the resulting product in a solvent, and then coating various substrates with the solution of the product. Ender, in U.S. Pat. No. 3,166,527, describes the mixing of an epoxysilane with an aminosilane, then coating surfaces with both the unreacted mixture and the reacted (partially polymerized) mixture. The coating was cured by standing at room temperature for a longer period of time or by heating for a shorter period of time.

Koda, in U.S. Pat. No. 3,961,977, describes the use of a partially hydrolyzed (10–40%) aminoalkoxysilane and an epoxysilane in a coating mixture. The two are dissolved in a solvent that may include a ketone. The ketone, although not claimed as a blocking agent to polymerization, appears to impede polymerization, thus extending the pot life.

Treadway and Carr, in U.S. Pat. No. 4,378,250, describe the use of aldehydes or ketones as blocking agents in polymeric compositions derived from certain aminosilanes and epoxysilanes. The reference also describes the nuance of increasing the hydrolysis of the silanes to above 40%. The reference describes greater abrasion resistance in the cured product and longer pot life in the curable composition because of the presence of the ketone acting to retard the reaction between the amine functionality and the epoxy functionality on the various reactants. The use of two different silanes make the formulation of the coating ponderous and, furthermore, there is a limited dye tintability range that can be obtained by varying the ratio of epoxy to amino within the bounds of compositions described for attaining the desired level of abrasion resistance. Replication of these compositions shows crosslink equivalent weights of at least about 173 when fully cured.

Copending U.S. patent application Ser. No. 09/010,731 filed on Jan. 22, 2000, now U.S. Pat. No. 6,057,040, relates to an improved coating comprising a coating on a substrate is described. The coating comprises a crosslinked polymeric material derived from an alkine-bridged bis-(aminosilane) or comprising a mixture of the alkine-bridged bis-(aminosilane) and an epoxysilane. The alkine bridged bis-(aminosilane) may have the general formula:

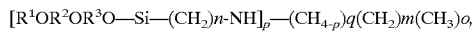

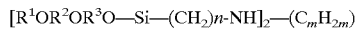

or

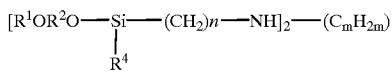

wherein $R^1$, $R^2$, and $R^3$ are independently selected from alkyl groups of 1 to 4 carbon atoms or phenyl groups, $R^4$ is selected from hydrogen, phenyl groups, and alkyl of from 1 to 4 carbon atoms, and n is 1, 2, 3 or 4, p is 2, 3 or 4, q is 0 or 1, o is 0 or 1, and m is 1, 2, 3 or 4, wherein q plus m is 1 or 2, o is 1 only when all aminosilane groups are bonded to the other alkine groups, and when p is 4, both m and o are zero, or preferably

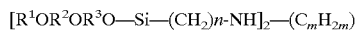

wherein $R^1$, $R^2$, and $R^3$ are independently selected from aliphatic groups or aromatic groups, and n is 1, 2, 3 or 4, and m is 1, 2, 3 or 4.

The alkine bridged bis-(aminosilane) is itself a novel compound. A novel coating composition comprises a coating composition comprising a solution comprising and epoxysilane and an alkine-bridged bis-(amino-silane), especially where the alkine-bridged bis-(amino-silane) has the general formula:

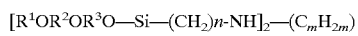

wherein $R^1$, $R^2$, and $R^3$ are independently selected from aliphatic groups or aromatic groups which complete a silane, and n is 1, 2, 3 or 4, and m is 1, 2, 3 or 4.

SUMMARY OF THE INVENTION

The present invention relates to a novel bis-aminosilane, coating compositions containing the bis-aminosilane, coatings made from those coating compositions, and articles having the cured coating compositions on at least one surface thereof. The coating compositions comprise at least the crosslinked product of the bis-aminosilane and preferably at least two polymerizable compounds (one of which is the bis-aminosilane of the present invention). These compositions may form a crosslinked polymeric coating. At least one of the polymerizable compounds comprises an alkine-bridged bis-(aminesilane) and another preferred polymerizable compound in the composition comprises an epoxy-functional silane. The coatings provided from these compositions are highly crosslinked and display excellent mar resistance, as well as increased tintability, a very unusual combination. It is common in the art that where one of these properties increases, it is done at the expense of the other property.

DETAILED DESCRIPTION OF THE INVENTION

Abrasion resistant coating technology and solvent resistant coating technology often tend to overlap in the range of useful chemistries, and the technologies are used in a wide range of commercial products. In general, polymeric surfaces tend to require protection against abrasion and solvent attack, but soft metal surfaces and composite surfaces may likewise need protection. Additionally, even a single substrate composition may require different quality or different types of resistance, depending on the environment into which the surface is being placed. It is therefore desirable to provide the widest range of compositions to allow selection for use among the various fields or environments of use to which vulnerable surfaces are introduced.

A starting monomer or comonomer for use in the practice of the present invention comprises a tetrahydrocarbyl-aminosilane in which a central carbon atom has all four valences bonded to an amino silane group that can be subsequently polymerized to form a tightly packed, crosslinked hard coat or abrasion resistant coating, particularly for polymeric surfaces such as ophthalmic lenses. The starting compound for the polymer may be represented by the formula:

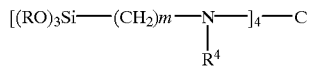

wherein the amino-silane groups may have different R groups within each aminosilane group and between each aminosilane group, as where each aminosilane group comprises

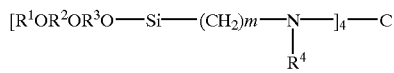

wherein the $R^1$, $R^2$, and $R^3$ group of each of $R^1O$, $R^2O$ and $R^3O$ may be the same or different amongst each of the aminosilane groups. The term tetrahydrocarbyl indicates that all four valences of the bridging carbon atom have been substituted with the described aminosilane functionality. $R^4$ is selected from hydrogen, phenyl groups, and alkyl of from 1 to 4 carbon atoms.

The term alkine group or alkylene group is used to describe an alkane with two hydrogens removed to form a divalent bridging group or a monovalent alkyl group with an additional hydrogen removed to form the divalent group. Both of the alkine groups, —$(CH_2)m$- and —$(CH_2)n$-, which also may be further substituted (that is, a hydrogen replaced with substituent groups compatible with the use of the monomer in forming abrasion resistant coating system), are known in the art to have the potential for substitution within the general field of practice of the present invention. In particular, there are numerous substitutions such as lower alkyl, halogen, nitro, phenyl, etc. on the —$(CH_2)n$- group, and as later described in more detail in the synthetic procedures of the present invention, the —$(CH_2)m$- may particularly have halogen substitution present, e.g. especially where all halogen atoms have not reacted during the acid-base amine-halogen reaction, leaving alkine bridging groups such as —$(CHCl)m$-, —$(CHBr)m$-, or even —$(CCl_2)m$-.

These monomers may be homopolymerized or copolymerized with a wide variety of comonomers that can be reacted with silane group. These comonomers may have only silane functionality (as with the monomers described in copending U.S. patent application Ser. No. 09/010,731) or also have separate (ambifunctional) groups on other regions of the monomer that can independently react. Typical ambifunctional silane compounds would include epoxy-silanes, acryloylsilanes, and the like. The ambifunctional comonomer may be generically described as:

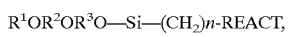

wherein n, $R^1$, $R^2$, $R^3$ are as defined above and REACT is any polymerizable group (e.g., ethylenically unsaturated groups such as vinyl, allyl, acryloyl, methacryolyl, epoxy, silane, alcohol groups, acid groups, free hydrogen containing group, cyano groups, mercapto groups, etc.), including the silane groups —$R^1OR^2OSiR^3$—, —$R^1OSiR^2R^3i$—, and —$R^1OR^2OR^3O$—Si—, which are, of course, copolymerizable with silane groups.

The epoxy-functional silane may be described by the formula:

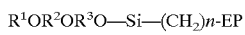

wherein
$R^1O$, $R^2O$, and $R^3O$ are independently selected from aliphatic groups (e.g., alkoxy, with $R^1$, $R^2$ and $R^3$ defining aliphatic groups such as alkyl) or aromatic groups (e.g., phenoxy, with $R^1$, $R^2$ and $R^3$ defining aromatic groups such as phenyl or substituted phenyl) which complete a silane on the Si (silicon) atom, preferably alkyl groups or phenyl groups, and more preferably unsubstituted alkyl groups, n is as described above, and EP represent a glycidyl (e.g., glycidoxy) or cyclohexane-oxide (epoxycyclohexyl) or cyclopentane-oxide (epoxycyclopentyl) epoxy polymerizable group.

It is well recognized within the art that some substitution of the compounds used in forming the compositions is not only tolerable, but in some instances highly desirable. Where the term "group" is used to refer to a substitutent or nucleus, that term is specifically inclusive of both substituted and unsubstituted substituents or nuclei. For example, the term "alkyl group" refers to not only the pure hydrocarbon within the definition of alkyl (e.g., methyl ethyl, octyl, iso-octyl, dodecyl, etc.), but also those materials within the art recognized as substituted alkyls, such as monosubstituted halo-alkyl, hydroxyalkyl, ether groups (e.g., $CH_2$—O—$CH_2$—, etc.), and the like. Where the chemical group is used without description of a group or described as a moiety, such as with ethyl or hexyl moiety, or decyl, that phrase excludes substitution.

Aminoalkylalkoxysilane Precursors

A great number of aminoalkylalkoxysilane precursors are known and suitable for conversion to the alkine-bridged bis-(amine-silane) of the present invention. Many suitable aminoalkylalkoxysilane precursors may be represented by the structure below:

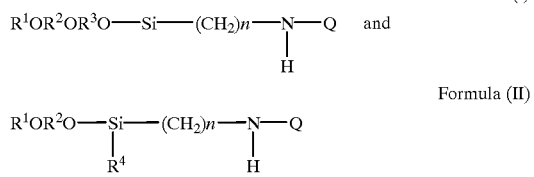

wherein $R^1O$, $R^2O$, $R^3O$ and n are as defined above, $R^1$, $R^2$ and $R^3$ are independently monovalent hydrocarbon radical (e.g., alkyl and other aliphatic radicals, especially alkyl groups and most particularly methyl and ethyl), Q is a hydrogen or other halide reactive group, and $R^4$ is selected from hydrogen, aliphatic and phenyl groups, alkyl of from 1 to 20 carbon atoms or especially alkyl groups of from 1 to 4 carbon atoms. Were the group $R^4$ an alkoxy group, the compounds of Formula (II) would be within the scope of Formula (I). For example, many known and suitable aminoalkylalkoxysilanes useful as precursors for the first component are as follows:

aminoethyl-triethoxysilane, beta-aminoethyltrimethoxysilane, beta-aminoethyl-triethoxysilane, beta-amino-ethyl-tributoxysilane, beta-aminoethyl-tripropoxysilane, alpha-aminoethyl-trimethoxysilane, alpha-aminoethyl-triethoxysilane, gamma-aminopropyltrimethoxysilane, gamma-aminopropyl-triethoxysilane, gamma-aminopropyl-tributoxysilane, gamma-amino-propyltripropoxysilane, beta-aminopropyl-trimethoxysilane, beta-aminopropyl-triethoxysilane, beta-amino-propyltripropoxysilane, beta-aminopropyl-tributoxysilane, alpha-aminopropyl-trimethoxysilane, beta-aminopropyl-tributoxysilane, alpha-aminopropyl-trimethoxysilane, alpha-aminopropyl-triethoxysilane, N-aminomethylaminoethyl-trimethoxysilane, N-aminomethylaminomethyl-tripropoxysilane, N-aminomethyl-beta-aminoethyltrimethoxysilane, N-aminomethyl-beta-aminoethyl-triethoxysilane, N-aminoethylbeta-aminoethyl-tripropoxysilane, N-aminomethyl-gammna-aminopropyltrimethoxysilane, N-aminomethyl-gamma-aminopropyl-triethoxysilane, N-aminomethyl-gamma-aminopropyl-tripropoxysilane, N-aminomethyl-beta-aminopropyl-trimethoxysilane, N-aminomethyl-beta-aminopropyl-triethoxysilane, N-aminomethyl-beta-aminopropyl-tripropoxysilane, N-aminopropyltripropoxysilane, N-aminopropyl-trimethoxysilane, N-(beta-aminoethyl)-beta-aminoethyl-trimethoxysilane, N-(beta-aminoethyl)-beta-aminoethyl-triethoxysilane, N-(beta-aminoethyl)-beta-aminoethyl-tripropoxysilane, N-(beta-aminoethyl)-beta-aminoethyl-trimethoxysilane, N-(beta-aminoethyl)-alpha-aminoethyl-triethoxysilane, N-(beta-aminoethyl)-alpha aminoethyl-tripropoxysilane, N-(beta-aminoethyl)-beta-aminopropyl-trimethoxysilane, N-(beta-aminoethyl)-gamma-aminopropyl-triethoxysilane, N-(beta-aminoethyl)-gamma-aminopropyl-tripropoxysilane, N-(beta-aminoethyl)-gamma-aminopropyl-trimethoxysilane, N-(beta-aminoethyl)-beta-aminopropyl-triethoxysilane, N-(beta aminoethyl)-beta-aminopropyl-tripropoxysilane, N-(gamma-aminopropyl)-beta-aminoethyl-trimethoxysilane, N-(gamma-aminopropyl)-beta-aminoethyl-triethoxysilane, N-(gamma-aminopropyl)-beta-aminoethyl-tripropoxysilane, N-methylaminopropyl trimethoxysilane, beta-aminopropyl methyl diethoxysilane, gamma-diethylene triamine-propyltriethoxysilane. The N-beta and N-gamma alternatives are less preferred materials within the class of materials useful in the practice of the present invention.

Coatings may thus be formed where the alkine-bridged aminosilane is a hydrolyzed (which includes partial hydrolyzation) product of a compound of the formula:

which may be used alone or in combination with comonomers, including those of copending U.S. patent application Ser. No. 09/010,731:

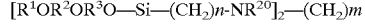

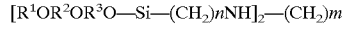

$[R^1OR^2OR^3O-Si-(CH_2)nNH]_2-(CH_2)m$ or

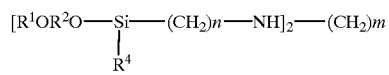

wherein
  $R^1O$, $R^2O$, and $R^3O$ are independently selected from aliphatic groups or aromatic groups which complete a silane on the Si (silicon) atom, preferably alkyl-O-groups or phenyl-O- groups, wherein $R^1$, $R^2$, and $R^3$ are independently selected from alkyl groups (e.g., of from 1 to 4 carbon atoms, especially 1 or 2 carbon atoms) and phenyl groups, and more preferably unsubstituted alkyl groups,
  $R^4$ is selected from hydrogen, aliphatic and phenyl groups, especially alkyl of from 1 to 20 carbon atoms or alkyl groups of from 1 to 4 carbon atoms;
  $R^{20}$ is selected from H, alkyl group of from 1 to 4 carbon atoms (preferably 1 or two carbon atoms) and phenyl group; and
  n is 1, 2, 3 or 4, preferably 3,
  p is 2, 3 or 4 (preferably 2 or 3),
  q is 0 or 1,
  o is 0 or 1, and
  m is 1, 2, 3 or 4, most preferably 1 or 2.
q plus m is preferably 1 or 2, o is 1 only when all aminosilane groups are bonded to the other alkine groups (i.e., $(CH_{4-p})q$ or $(CH_2)m$), and when p is 4, both m and o are zero.

The terminology "alkine-bridged" refers to the fact that the divalent group $-(CH_2)m-$ forms a bridge between the two amino-silane groups $[R^1OR^2OR^3O-Si-(CH_2)n-NH]_2$ in forming the compound. The term alkine group is used to describe an alkane with two hydrogens removed to form a divalent bridging group or a monovalent alkyl group with an additional hydrogen removed to form the divalent group. Both of the alkine groups, $-(CH_2)m-$ and $-(CH_2)n-$, which also may be further substituted, are known in the art to have the potential for substitution within the general field of practice of the present invention. In particular, there are numerous substitutions such as lower alkyl, halogen, phenyl, etc. on the $-(CH_2)n-$ group, and as later described in more detail in the synthetic procedures of the present invention, the $-(CH_2)m-$ may particularly have halogen substitution present, e.g., especially where halogen atoms have not reacted during the acid-base amine-halogen reaction, leaving alkine bridging groups such as —(CHCl)m-, —(CHBr)m-, or even —(CCl$_2$)m-.

Epoxy-functional Silanes

The second component is an epoxy-functional silane, often referred to in the art as an epoxyalkylalkoxysilane or just epoxy-silane. Many suitable epoxyalkylalkoxysilane precursors may be represented by general formula below:

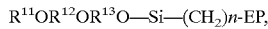

wherein

R$^{11}$O, R$^{12}$O, and R$^{13}$O are independently selected from aliphatic groups or aromatic groups which complete a silane on the Si (silicon) atom, preferably alkyl groups or phenyl groups, and more preferably unsubstituted alkyl groups, n is as described above, and EP represent a glycidyl (e.g., glycidoxy) or cyclohexane-oxide (epoxycyclohexyl) or cyclopentane-oxide (epoxycyclopentyl) epoxy polymerizable group.

The epoxy silanes may also be represented by the formula:

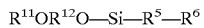

or

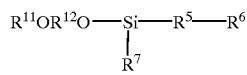

wherein R$^5$ is a divalent hydrocarbon group having 1 to about 14 carbon atoms, R$^6$ is a glycidoxy epoxycyclopentyl or epoxycyclohexyl group, and R7 comprises hydrogen, an aliphatic group or a phenyl group, and alkyl of from 1 to 20 or especially from 1 to 4 carbon atoms. The epoxysilanes may also be hydrolyzed (which includes partial hydrolyzation).

A wide variety of epoxyalkylalkoxysilanes are suitable as precursors for the second component, many of which are as follows:

gamma-glycidoxymethyl-trimethoxysilane, gamma-glycidoxymethyltriethoxysilane, gamma-glycidoxymethyl-tripropoxysilane, gamma-glycidoxymethyl-tributoxysilane, beta-glycidoxyethyltrimethoxysilane, beta-glycidoxyethyltriethoxysilane, beta-glycidoxyethyl-tripropoxysilane, beta-glycidoxyethyl-tributoxysilane, beta-glycidoxyethyltrimethoxysilane, alpha-glycidoxyethyl-triethoxysilane, alpha-glycidoxyethyl-tripropoxysilane, alpha-glycidoxyethyltributoxysilane, gamma-glycidoxypropyl-trimethoxysilane, gammaglycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxyypropyl-triethoxysilane, beta-glycidoxypropyl-tripropoxysilane, beta-glycidoxypropyltributoxysilane, alpha-glycidoxypropyl-triethoxysilane, alpha-glycidoxypropyl-triethoxysilane, alpha-glycidoxypropyl-tripropoxysilane, alpha-glycidoxypropyltributoxysilane, gamma-glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-propoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxysilane, alpha-glycidoxybutyl-tripropoxysilane, alpha-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyltrimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl) butyl-triethoxysilane, (3,4-epoxycyclohexyl)-butyl-tripropoxysilane, (3,4-epoxycyclohexyl)butyl-tributoxysilane.

Partial Hydrolysates

The aminoalkylalkoxysilane precursor and the epoxyalkylalkoxysilane precursor may be, but are less preferably, partially hydrolyzed in forming compositions of the present invention. The hydrolysates may actually be in a gel form rather than easily flowing liquid, depending upon the degree of hydrolysis.

Hydrolysis refers to the initial products of reaction of water with alkoxy groups of the aminoalkylalkoxysilane precursor and/or of the epoxyalkylalkoxy silane precursor. Silanols are relatively unstable and tend to condense spontaneously. Thus, the simultaneous hydrolysis of a mixture of different silanes is normally referred to as co-hydrolysis, and a hydrolysate refers to the end product of hydrolysis where some condensation has normally occurred during the hydrolysis reaction, so that homopolymers or copolymers are formed.

The reagent or precursor compounds of both the epoxysilanes and the aminosilanes used in the practice of the present invention include at least two, and usually three, alkoxy groups covalently bonded to a silicon atom. Each of these reagents may be partially hydrolyzed to form the partial hydrolysate thereof by adding enough water to hydrolyze greater than 20% of the two or three available alkoxy groups, and more preferably having enough water to hydrolyze more than about 40% of these alkoxy groups.

Partial hydrolysis of the aminoalkylalkoxysilane precursor may be performed by adding enough water to hydrolyze an amount of the available alkoxy groups, and an approximately equal amount of a water soluble alcohol, such as ethanol or methanol, may be added to aid solubility. The mixture may be equilibrated, or ripened, for a sufficient period of time to effect the partial hydrolysis. The partial hydrolysis may be performed either by stripping off volatiles, such as the volatile alcohol byproduct of the hydrolysis, or not.

As a basic background to the practice of the present invention, the following underlying reactions and processes are believed to occur. The aminosilane reagent, herein described as Silane-N—H$_2$ for simplicity, is reacted with a halogen substituted alkane, e.g., methylene chloride, chloroform, methylene bromide, bromoform, 1,2-dichloroethane, 1,2-dichloro-1,2,dibromoethylene, etc. Iodo counterparts of these compounds (with 100% iodine susbtituents or partial iodine substitution) are also useful within the practice of the present invention. Methylene chloride will be used in the schematic to exemplify the reaction without limiting then scope of the invention. In reacting the Silane-H$_2$ with the halogenated alkane, the following reaction occurs:

Silane-N—H$_2$+Cl$_2$CH$_2$→Silane-NH—CH$_2$—NH-Silane+2HCl

This reaction generates a new reactant which can provide a higher crosslink density than the original aminosilane. It is desirable to keep the alkine bridging group as small as possible (e.g., methine is most preferred and ethylene is next preferred).

The coating composition of the present invention is formed by combining an alkine-bridged bis-amine-silane (which may also be referred to as a bis-silaneamino-methide, the methide group including substituted methide, especially methyl methide or ethylene as the bridging group) with an epoxysilane. Longer chain bridging groups such as propyl or butyl can be made on the aminosilane, but these add a softness to the polymer coating which may not be desirable for mar resistant coatings. These longer chain bridged alkine-bridged bis-aminosilanes may be good additives where some modest flexibility is desired without having to add a non-crosslinkable monomer which would add only to flexibility and could be more erratic in its effects as compared to the longer chain bridging group alkine-bridged bis-(aminosilane). If necessary or desired, a solvent may be provided to adjust the composition to the proper coating viscosity for the method of application. When the coating is applied to a substrate, it can be polymerized and hardened in an oven. The resulting coating is crosslinked by silanol condensation and by the alkylation of the aminosilane to provide an exceptionally durable coating perhaps due to the latter crosslinking reaction which would provide higher crosslink density (i.e., a lower crosslink equivalent weight)) thereby resulting in better scratch resistance than would otherwise be possible. In addition, a range of tint values and shorter tinting times can be produced by suitable variations of the proportions of epoxy to aminosilane components. There are numerous classes of catalysts which may also be used to improve the speed or manner of crosslinking and curing of the polymerizable groups. For example, perfluorinated alkylsulfonyl methides (and their amide counterparts) are known to be active catalysts for the silane condensation and for epoxy polymerization. Photoinitators such as the onium catalysts with complex fluorinated anions (e.g., triphenylsulfonium hexafluoroantimonate, diphenyl iodonium tetrafluoroborate, diphenyl, phenylthiophenylsulfonium hexafluoroantimonate) are known photinitators for both the epoxy polymerization and the silane condensation reactions.

Copolymerizable monomers, oligomers or polymers may also be present in the compositions of the present invention as well as fillers, adjuvants and conventional additives. For example, additional silane monomers, epoxy monomers or other crosslinkable materials may be present, such as titanate esters, acrylatesilanes (e.g., acryloxypropyltrimethoxy silane, methacryloxypropyltrimethoxy silane), and the like. Caution should be exercised in these options to assure that the crosslink density is not severely diminished, which would worsen hardness of the surface of the coating, or that other physical parameters are not adversely affected, as by the addition of softness or too great flexibility to the material composition of the coating. Additives to the compositions which would be particularly useful would include LW absorbers, such as benzophenones, Tinuvin™, and other known classes of UV absorbers for polymeric materials, dyes, pigments, flow control agents, antistatic agents, surfactants, and the like.

The coating composition of the present invention is suitable for coating plastic substrates such as windows, windscreens, goggles, ophthalmic lenses, watch face guards, light emitting diode panel covers, liquid crystal display covers, dashboard arrays, computer screens, and the like. In particular, the coating composition is suitable for providing an abrasion resistant and mar resistant coating for polycarbonate ophthalmic lenses.

Suitable epoxysilanes include, by way of a non-limiting example, compounds of the general formula:

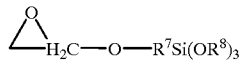

where $R^7$ may be an alkine (e.g., —CH$_2$—, —(CH$_2$)n-, wherein n is an integer between 1 and 6) bridging group, and $R^8$ at the various positions independently may be any stable combination of alkyl, alkoxyalkyl, aminoalkyl or other radical formed as a combination of carbon and hetero atoms, preferably alkyl of from 1 to 2 carbon atoms. Particularly preferred due to availability and price is gamma-glycidoxypropyltrimethoxysilane. Epoxy compounds that contain no silicon may also be used, including the glycidylethers of various diols or polyols. These may be desirable if some flexibility is desired, with some modest loss of hardness or mar resistance in the coating.

Some of the suitable aminosilanes can be alternatively described as having the general formula $R^9$NH—$R^7$—Si(OR)$_3$, where $R^7$ may be an alkine (e.g., —CH$_2$—, —(CH$_2$)n-, wherein n is an integer between 1 and 6) bridging group, $R^8$ at the various positions may be any stable combination of alkyl, alkoxyalkyl, alkylamino or other radical formed as a combination of carbon and hetero atoms, preferably alkyl of from 1 to 2 carbon atoms. Particularly preferred due to availability and price are 3-aminopropyltrimethoxysilane or 3-aminopropyltriethoxysilane.

It is understood in the art that structural nomenclature and formulae such as

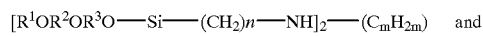

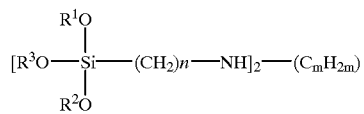

Are equivalents and are merely shorthand notations of each other. Similarly, structures such as —(C$_m$H$_{2m}$) versus —(CH$_2$)$_m$ should not be read so as to differentiate between linear alkyl and branch chain alkyl, such as between the alkine counterparts of n-propyl and iso-propyl, both of which have empiric formulae of C$_3$H$_6$, even though their structural formulae are

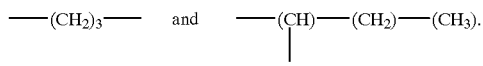

The compositions and coatings of the present invention are noteworthy for a number of reasons. As compared to the coatings of U.S. Pat. No. 4,378,250, the coatings of the present invention are more highly crosslinked. The coatings of that patent, when fully cured, display crosslink equivalent weights of 173 and higher. The coatings of the present invention when fully cured display crosslink equivalent weights of less than 150, less than 125, less than 100, less than 80 and a crosslink equivalent weight of 75 has actually been determined in the compositions of the present invention when fully cured. The crosslink equivalent weight is the average molecular weight of the polymer divided by the number of crosslink bonds on the polymer molecule. This value may be determined by any of a number of means, many of which vary only slightly with respect to the equivalent weight value determined for any sample.

Suitable solvents include many of the solvents commonly used for epoxies, silanes, epoxysilanes, aminosilanes, and the like, including, but not limited to alcohols, halogenated hydrocarbons such as, but are not limited to, dichloromethane, trichloromethane or 1,1,1-trichloroethane, ketones (e.g., methyethyl ketone), polar solvents, polar hydrocarbon solvents (e.g., toluene), and the like. The halogenated solvent should have at least two halogen atoms as part of the molecular structure. Chlorine, bromine, and iodine are the preferred halogens. Although these solvents may include the halogenated alkanes used in the practice of the present invention to dimerize the amino-silane reagents, they may be used in the practice of the present invention since the dimerization reaction with the primary amine to convert it to a secondary amine has already occurred. The compositions of the present invention may be free of ketones (as required in U.S. Pat. No. 4,378,250) and may be hydrolyzed before or after formation of the bis-(aminosilane) alkine.

The composition preferably contains a surfactant that is used as a flow-controlling agent for regulating film thickness and enhancing the cosmetic appearance of the coated article. An example is Fluorad FC-430, an fluoroester (e.g., fluorinated alkyl ester or fluoroaliphatic polymeric ester) flow control agent which is manufactured by the 3M Corporation, St. Paul, Minn.

The examples set forth below are intended for illustrative purposes and should not be construed as limiting the invention in any way.

EXAMPLE

Solution A was prepared by adding a mixture of 340 grams of water and 7 grams of 10% by weight hydrochloric acid in water to hydrolyze 1653 grams of 3-glycidoxypropyltrimethoxysilane. The resulting solution was allowed to mix at room temperature for at least 24 hours before using.

Solution B was prepared by adding 279.6 grams of water to 1720.4 grams of 3-aminopropyltriethoxysilane while stirring. The resulting solution was allowed to mix at room temperature for at least 24 hours before using.

Solution C was prepared by dissolving 10 grams of FC-430 (fluoroester surfactant manufactured by 3M Co.) in 90 grams of trichloromethane.

To 164.9 grams of Solution A was added 13.0 grams of Heloxy 107, the diglycidylether of cyclohexanedimethylol. This mixture was then added to a mixture of 137.4 grams of Solution B and 401.4 grams of trichloromethane. Ethanol (75.0 grams) and 8.2 grams of solution C were added while mixing. The resulting coating was stored overnight in a freezer at ° F. until the following day. At that time, polycarbonate lenses were dip coated, held at 180° F. for 30 minutes, and cured for 4 hours in a forced air oven at 265° F. The lenses were dyed for thirty minutes in a BPI black aqueous tint bath and passed the adhesion test. The abrasion resistance of the coated lenses were measured by the Bayer test method and found to be superior to lenses coated with an analogous coating which was made using butanone in place of trichloromethane. The lenses treated with the trichloromethane containing coating had good general appearance with less yellowness than their butanone counterparts. The adhesion and resistance to hot aqueous media (tint baths) of the proposed coating were also superior. Adhesion was tested by ASTM D 3359.

The alkine-bridged bis-(aminosilane) is formed during the curing of the combination of solutions C and B while they are present on the lens in solution.

The alkine-bridged bis-aminosilanes of the present invention can be made according to the following mechanism, which will produce a blend or mixture of various alkine-bridged bis-aminosilanes, because of the various reactions which may occur. 3-glycidoxypropyltrimethoxysilane may be mixed in solution with any of the halogenated hydrocarbons listed above, either before hydrolysis or after hydrolysis. The alkine-bridged bis-aminosilanes will be produced over time without need for catalysis, or heating, or addition of other materials. As noted, various numbers of the halogen atoms on the halogenated carbon atoms may be randomly replaced, so that variations in the resulting alkine-bridged bis-aminosilanes will occur, with some (few) mono aminosilane-alkyls being present as well, with or without halogen substitution on the alkyl. The alkine-bridged bis-aminsosilanes will comprise various distributions of materials within the formulae:

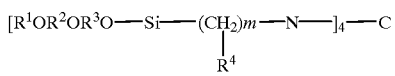

wherein

R$^1$, R$^2$, and R$^3$ are independently selected from alkyl groups of 1 to 4 carbon atoms or phenyl groups, R$^4$ is selected from hydrogen, phenyl groups, and alkyl of from 1 to 4 carbon atoms, and m is 1, 2, 3 or 4, wherein q plus m is 1 or 2, o is 1 only when all aminosilane groups are bonded to the other alkine groups, and when p is 4, both m and o are zero.

Comparative Example

A coating solution was made up according to U.S. Pat. No. 4,378,250 using equimolar amounts of the epoxysilane and the aminosilane. Lenses were coated with this composition and cured at 250 F. for 4 hours. Tinted lenses exhibited 58% total light transmission.

General Process for Application of Coatings to Lenses

As the coatings of this invention tend to be reactive at room temperature, the coatings should be stored at about 0° F. until they are to be applied. Prior to application, the coating solution is warmed to the appropriate temperature for application, such as room temperature. The appropriate temperature is determined according to the solvent used and the desired coating characteristics. Typical coating temperatures are from 30 to 50° F. The coating is typically applied by dip coating, although spin coating or any other process compatible with the surface to be treated is acceptable. The coated article, such as an ophthalmic lens, is then placed into a forced air oven at an appropriately elevated temperature, usually from 120 to 200° F., preferably from 170 to 190° F. The lens is maintained for an amount of time sufficient to provide the degree of cure desired in the article when it is removed from the oven. With thermal curing (as compared to photoinitiated cure or highly catalyzed thermal curing), the lens may be treated for a few minutes to a few hours, typically from 15 minutes to 1 hour. After this initial temperature treatment, the lenses should be transferred immediately to a second heating environment such as another forced air oven at a temperature above 250° F. Preferably the second oven temperature is between 260 and 270° F.

The compositions of the present invention have been described primarily for use with the coating of optical elements such as ophthalmic lenses, but may be used to provide abrasion resistance to many other substrates, such as, but not limited to, flat glass, polymeric film, light filters, countertops, finger nails, CRT screens, LED screens and panels, furniture and the like.

What is claimed is:

1. A coating on a substrate, said coating comprising a crosslinked polymeric material derived from atetrahydrocarbyl-amionsilane of the formula:

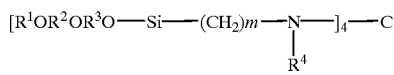

wherein the $R^1$, $R^2$, and $R^3$ group of each of $R^1O$, $R^2O$ and $R^3O$ may be the same or different amongst each of the aminosilane groups and are selected from the group consisting of alkyl groups and aryl groups, $R^4$ may be hydrogen or an alkyl group, and m is an integer from 1 to 8.

2. The coating of claim 1 wherein said tetrahydrocarbyl-aminosilane is copolymerized with a comonomer of the formula:

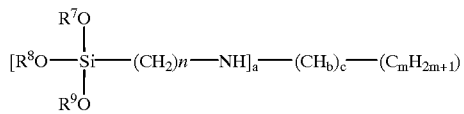

wherein
$R^7$, $R^8$, and $R^9$ are independently selected from aliphatic groups or phenyl groups;
a, b and c operate together as a) a=2, b=1 and c=1 and b) a=1, b=2 and c=1;
n is 1, 2, 3 or 4, and
m is 1, 2, or 3.

3. The coating of claim 2 wherein $R^1$, $R^2$, and $R^3$ are independently selected from methyl and ethyl.

4. The coating of claim 3 wherein m is 1 and n is 3.

5. The coating of claim 1 wherein the crosslinked polymeric material further comprises units derived from an epoxysilane represented by the formula:

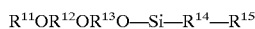

or

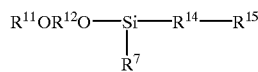

wherein $R^{14}$ is a divalent hydrocarbon group having 1 to 14 carbon atoms, $R^{15}$ is a glycidoxy, epoxycyclopentyl or epoxycyclohexyl group, and $R^{11}O$, $R^{12}O$, and $R^{13}O$ are independently selected from aliphatic groups or aromatic groups which complete a silane, and $R^7$ represents a hydrogen, alkyl group of up to four carbon atoms or alkoxy group of up to four carbon atoms.

6. The coating of claim 5 wherein $R^1$, $R^2$, and $R^3$ are independently selected from alkyl groups and phenyl groups.

7. The coating of claim 5 wherein said epoxysilane is represented by the formula:

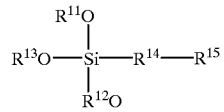

wherein $R^{14}$ is a divalent hydrocarbon group having 1 to 14 carbon atoms, $R^{15}$ is a glycidoxy, epoxycyclopentyl or epoxycyclohexyl group, and $R^{11}$, $R^{12}$, and $R^{13}$ are independently selected from alkyl groups of 1 or 2 carbon atoms.

8. The coating of claim 2 wherein the crosslink equivalent weight of the coating is less than 150.

9. The coating of claim 5 wherein $R^{11}$, $R^{12}$, and $R^{13}$ are independently selected from methyl and ethyl, $R^{14}$ is —$CH_2$—$CH_2$—$CH_2$—, $R^{15}$ is glycidoxy, and the crosslink equivalent weight of the coating is less than 125.

10. A coating composition comprising a solution comprising an epoxysilane and at least one tetrahydrocarbyl-aminosilane of claim 1.

11. A coating composition of claim 2 further comprising an epoxysilane wherein said tetrahydrocarbyl-aminosilane comprises a compound of the general formula:

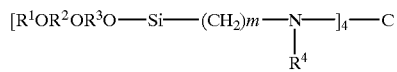

wherein
$R^1$, $R^2$, and $R^3$ are independently selected from alkyl groups or phenyl groups, and
m is 1, 2, 3 or 4.

12. The coating composition of claim 11 wherein said epoxysilane is represented by the formula:

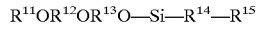

wherein $R^{14}$ is a divalent hydrocarbon group having 1 to 14 carbon atoms, $R^{15}$ is a glycidoxy, epoxycyclopentyl or epoxycyclohexyl group, and $R^{11}$, $R^{12}$, and $R^{13}$ are independently selected from alkyl groups and phenyl groups.

13. The coating composition of claim 12 wherein and $R^{11}$, $R^{12}$, and $R^{13}$ are independently selected from methyl and ethyl, $R^{15}$ is glycidoxy, and —$R^{14}$— is —$CH_2$—$CH_2$—$CH_2$—.

14. The coating composition of claim 10 wherein said epoxysilane is represented by the formula:

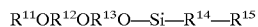

or

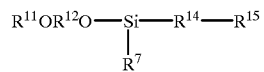

wherein $R^{14}$ is a divalent hydrocarbon group having 1 to 14 carbon atoms, $R^{15}$ is a glycidoxy, epoxycyclopentyl or epoxycyclohexyl group, and $R^{11}O$, $R^{12}O$, and $R^{13}O$ are independently selected from aliphatic alkoxy groups or aryloxy groups which complete a silane, and $R^7$ comprises a hydrogen, alkyl group of up to four carbon atoms or alkoxy group of up to four carbon atoms.

15. The coating of claim 1 wherein said tetrahydrocarbyl-aminosilane is a hydrolyzed product of a compound of the general formula:
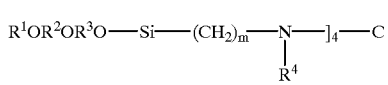
wherein
$R^1$, $R^2$, and $R^3$ are independently selected from aliphatic groups or phenyl groups, and
m is 1, 2, 3 or 4.
* * * * *